(12) United States Patent
Hera

(10) Patent No.: US 9,177,544 B2
(45) Date of Patent: Nov. 3, 2015

(54) ENGINE HARMONIC ENHANCEMENT CONTROL

(75) Inventor: Cristian M. Hera, Lancaster, MA (US)

(73) Assignee: Bose Corporation, Framingham, MA (US)

( * ) Notice: Subject to any disclaimer, the term of this patent is extended or adjusted under 35 U.S.C. 154(b) by 818 days.

(21) Appl. No.: 13/437,092

(22) Filed: Apr. 2, 2012

(65) Prior Publication Data
US 2013/0259259 A1   Oct. 3, 2013

(51) Int. Cl.
| | |
|---|---|
| *G10K 11/16* | (2006.01) |
| *A61F 11/06* | (2006.01) |
| *H03B 29/00* | (2006.01) |
| *H04B 1/00* | (2006.01) |
| *G10K 15/02* | (2006.01) |
| *B60Q 9/00* | (2006.01) |

(52) U.S. Cl.
CPC *G10K 15/02* (2013.01); *B60Q 9/00* (2013.01); *G10H 2250/371* (2013.01); *G10H 2250/381* (2013.01)

(58) Field of Classification Search
CPC . G10K 15/02; G10K 15/04; G10K 2250/371; G10K 2250/381; G10K 5/02; G10K 1/06; B60Q 9/00
USPC ............. 381/61, 58, 86, 71.4, 71.1, 56, 71.8, 381/71.14
See application file for complete search history.

(56) References Cited

U.S. PATENT DOCUMENTS

| | | |
|---|---|---|
| 2005/0259830 A1 | 11/2005 | Vaishya |
| 2009/0028353 A1* | 1/2009 | Kobayashi et al. ............. 381/61 |
| 2011/0216916 A1 | 9/2011 | Hera et al. |
| 2012/0106748 A1* | 5/2012 | Peachey et al. ................. 381/61 |

FOREIGN PATENT DOCUMENTS

WO   2011050274 A1   4/2011

OTHER PUBLICATIONS

International Search Report and Written Opinion dated Dec. 20, 2013 for International application No. PCT/US2013/034770.
International Preliminary Report on Patentability dated Oct. 16, 2014 for International application No. PCT/US2013/034770.

* cited by examiner

*Primary Examiner* — Vivian Chin
*Assistant Examiner* — Douglas Suthers
(74) *Attorney, Agent, or Firm* — Bose Corporation

(57) ABSTRACT

A system includes a controller for receiving first and second signals representative of a load on an engine, and generating based on the signals. Harmonic scaling elements generate a scaled version of a received engine harmonic signal. Each harmonic scaling element includes a harmonic specific mapping element for mapping the control parameter to a harmonic specific scaling factor. Some of the harmonic specific scaling factor values of the harmonic specific mapping element are mapped to control parameter values associated with a negative load on the engine, and some are mapped to control parameter values associated with a positive load on the engine. The control parameter values associated with the negative load are derived from the first signal, and control parameter values associated with the positive load are derived from the second signal. An adjustable gain element applies the harmonic specific scaling factor to the received engine harmonic signal.

6 Claims, 9 Drawing Sheets

ENGINE HARMONIC ENHANCEMENT CONTROL

BACKGROUND

This specification relates to engine harmonic enhancement.

In some situations, automobile operators find it desirable to hear the noise emanating from the engine of their automobile. For example, a driver of a sports car may want to hear engine noise as they accelerate. The operator may use the noise to determine when to shift gears or they may just find that engine noise enriches their driving experience.

However, many modern day automobiles are designed to reduce the amount of noise (e.g., road noise) that enters the automobile's cabin and reaches the operator. To achieve noise reduction, automobile designers often insulate the automobile's cabin with sound dampening materials (e.g., foam). The sound dampening materials do not discriminate between engine noise and other noise such as road noise. Therefore, the use of sound dampening materials tends to attenuate the amount of engine noise that reaches the operator. Furthermore, in some examples, the sound dampening materials attenuate certain frequencies of the engine noise more than others, resulting in an unnatural sounding engine noise reaching the operator.

Engine harmonic enhancement systems enhance the engine noise heard by the operator by playing a synthesized engine noise through the audio system in the cabin of the automobile.

SUMMARY

In a general aspect, a system includes a controller configured to receive a first signal representative of a load on an engine and to generate a control parameter based on the first signal, one or more harmonic scaling elements, each configured to receive the control parameter and a different engine harmonic signal of a plurality of engine harmonic signals and to generate a scaled version of the received engine harmonic signal. Each, harmonic scaling element includes a harmonic specific mapping element for mapping the control parameter to a harmonic specific scaling factor, wherein at least some of the harmonic specific scaling factor values of the harmonic specific mapping element are mapped to control parameter values which are associated with a negative load on the engine, and an adjustable gain element for forming a scaled version of the received engine harmonic signal including applying the harmonic specific scaling factor to the received engine harmonic signal.

Aspects may include one or more of the following features.

The controller may be further configured to receive a second signal representative of a throttle position and wherein the controller is further configured to generate the control parameter based on both the first signal and the second signal. At least some of the harmonic specific scaling factors of the harmonic specific mapping element may be mapped to control parameters which are associated with a positive load on the engine. The control parameters which are associated with the negative load on the engine may be derived from the first signal and the control parameters which are associated with the positive load on the engine may be derived from the second signal.

The controller may be further configured condition the first signal to remove transient components before generating the control parameter. The controller may be further configured to apply a scale factor to the first signal such that values of the first signal which are greater than a first threshold map to a linear range. The linear range may extend from 0% to 100%. The controller may be further configured to apply a first scale factor to the first signal such that negative values of the first signal map to a first linear range, and apply a second scale factor to the second signal such that all values of the second signal map to a second linear range. The first linear range may extend from −100% to 0% and the second linear range may extend from 0% to 100%. The first signal may include a torque signal.

In another general aspect, a method includes receiving a plurality of engine harmonic signals, receiving a first signal representative of a load on an engine, determining a control parameter based on the first signal, determining a harmonic specific scaling factor for each of one or more engine harmonic signals of the plurality of engine harmonic signals, and applying the corresponding harmonic specific scaling factor to each of the one or more engine harmonic signals. Determining the harmonic specific scaling factor includes, for each of the one or more engine harmonic signals, providing the control parameter to a corresponding harmonic specific mapping function configured to map control parameter values to harmonic specific scaling factor values wherein at least some of the harmonic specific scaling factor values are mapped to control parameter values which are associated with a negative load on the engine.

Aspects may include one or more of the following features.

The method may include receiving a second signal representative of a throttle position and wherein determining the control parameter is based on both the first signal and the second signal. At least some of the harmonic specific scaling factors may be mapped to control parameters which are associated with a positive load on the engine. The control parameters which are associated with the negative load on the engine may be derived from the first signal and the control parameters which are associated with the positive load on the engine may be derived from the second signal. Determining the control parameter based on the first signal may include conditioning the first signal to remove transient components. Determining the control parameter may include applying a scale factor to the first signal such that values of the first signal which are greater than a first threshold map to a linear range. The linear range may extend from 0% to 100%.

Determining the control parameter may include applying a first scale factor to the first signal such that negative values of the first signal map to a first linear range; and applying a second scale factor to the second signal such that all values of the second signal map to a second linear range. The first linear range may extend from −100% to 0% and the second linear range may extend from 0% to 100%. The first signal may include a torque signal.

In a general aspect, a system includes a controller configured to receive a first signal representative of a load on an engine and to generate a control parameter based on the first signal and one or more harmonic scaling elements. Each of the one or more harmonic scaling elements is configured to receive the control parameter and a different engine harmonic signal of a plurality of engine harmonic signals and to generate a scaled version of the received engine harmonic signal. Each harmonic scaling element includes a harmonic specific mapping element for mapping the control parameter to a harmonic specific scaling factor and an adjustable gain element for forming a scaled version of the received engine harmonic signal including applying the harmonic specific scaling factor to the received engine harmonic signal.

In another aspect, a method includes receiving a plurality of engine harmonic signals, receiving a first signal representative of a load on an engine, determining a control parameter based on the first signal, determining a harmonic specific scaling factor for each of one or more engine harmonic signals of the plurality of engine harmonic signals and applying the corresponding harmonic specific scaling factor to each of the one or more engine harmonic signals. Determining the harmonic specific scaling factor including, for each of the one or more engine harmonic signals, providing the control parameter to a corresponding harmonic specific mapping function configured to map control parameter values to harmonic specific scaling factor values; and Embodiments of the invention may have one or more of the following advantages.

Using a signal representative of an engine load to scale individual engine harmonics allows embodiments to generate one type of engine noise for positive engine loads and another type of engine noise for negative engine loads. This feature makes the result of the engine harmonic enhancement system sound more realistic than the result of conventional engine harmonic enhancement systems.

Using a signal representative of an engine load to scale individual engine harmonics enables the system to continuously change the harmonic structure of engine noise as engine load changes.

Other features and advantages of the invention are apparent from the following description, and from the claims.

DESCRIPTION

1 System Overview

Figure 1:
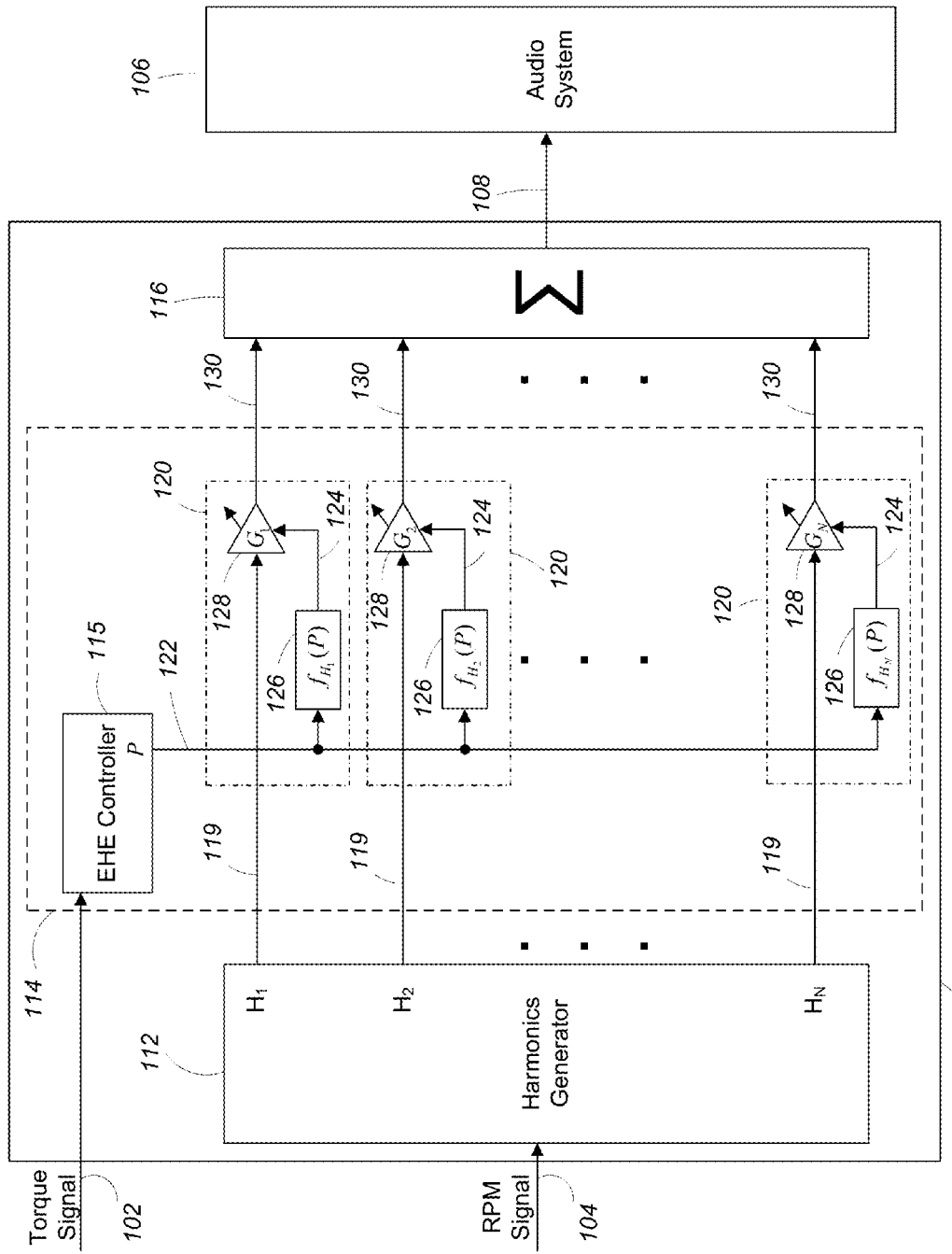
FIG. 1 is a block diagram of a first engine harmonic enhancement (EHE) system.

Referring to FIG. 1, an engine harmonic enhancement system 100 receives a torque signal 102 representative of a torque output of an engine (not shown) and an RPM signal 104 representative of a number of revolutions per minute of the engine as input signals. The system 100 uses the input signals 102,104 to form a combined engine harmonic signal 108 which is provided to an automobile audio system 106 for presentation to an automobile operator (not shown).

The engine harmonic enhancement system 100 includes a harmonics generator 112, an engine harmonic scaling module 114, and a summer 116. The RPM signal 104 is first provided to the harmonics generator 112 which generates a number of individual engine harmonics 119 based on the RPM signal 104. In some examples, the harmonics generator 112 includes a lookup table (LUT) which associates values of the RPM signal 104 with fundamental frequency values. The first harmonic ($H_1$) generated by the harmonics generator 112 is the fundamental frequency which corresponds to the value of the RPM signal 104. The remaining engine harmonics 119 ($H_2$-$H_N$) are generated at harmonic frequencies of the fundamental frequency.

The torque signal 102 and the engine harmonics ($H_1$-$H_N$) 119 generated by the harmonics generator 112 are provided to the engine harmonic scaling module 114 which generates a scaled version 130 of each of the engine harmonics 119 based on the torque signal 102. The torque signal 102 is especially useful for determining scaling factors for each of the engine harmonics 119 since it includes information relating not only the amount of load on the engine but also relating to whether the engine load is positive or negative. This information can be used, for example, to generate one type of engine noise when the automobile is accelerating and another type of engine noise when the automobile is decelerating due to engine braking.

The engine harmonic scaling module 114 includes an engine harmonic enhancement (EHE) controller 115 and a number of engine harmonic scaling elements 120. The EHE controller 115 receives the torque signal 102 and determines a control parameter, (P) 122, based on the torque signal 102. A number of embodiments of the EHE controller 115 are described in detail in later sections of this specification.

The EHE controller 115 provides the control parameter 122 to each of the engine harmonic scaling elements 120. Each engine harmonic scaling element 120 also receives one of the engine harmonics 119 generated by the harmonics generator 112. Each engine harmonic scaling element 120 scales the received engine harmonic 119 based on the control parameter 122.

To perform scaling of an individual engine harmonic 119, each engine harmonic scaling element 120 includes a mapping element 126 and an adjustable gain element 128. The mapping element 126 receives the control parameter 122 and uses it to determine a harmonic scaling value 124. In some examples, the mapping element 126 is a lookup table which includes a number of harmonic scaling values 124 which are associated with a corresponding control parameter 122 value. In other examples, the mapping element implements a mathematical function which receives the control parameter 122 as an input and calculates the harmonic scaling value 124. In some examples, each of the mapping elements 126 implements a different mapping between the control parameter 122 and the harmonic scaling values 124 depending on which engine harmonic 119 is being scaled by the engine harmonic scaling element 120 in which the mapping element 126 is included.

The received engine harmonic 119 and the harmonic scaling value 124 are provided to the adjustable scaling element 128 which applies the harmonic scaling value 124 to the received engine harmonic 119, resulting in the scaled engine harmonic signal 130.

Each of the scaled engine harmonic signals 130 generated by the harmonic scaling elements 120 is provided to a summer 116 which adds the scaled engine harmonic signals 130, resulting in the combined engine harmonic signal 108.

2 Torque Based EHE Controller

Figure 2:
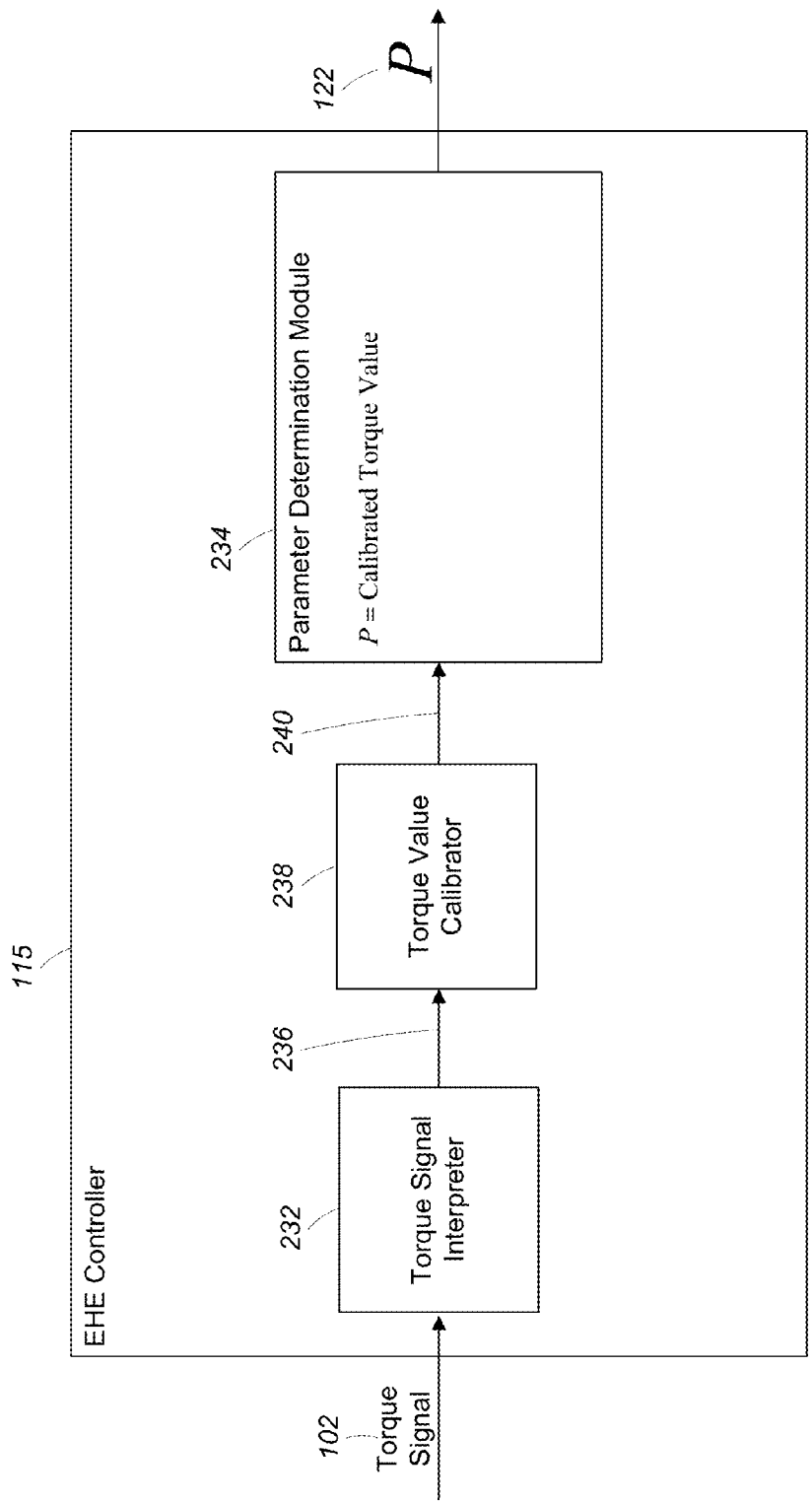
FIG. 2 is a block diagram of a first EHE controller.

Referring to FIG. 2, one embodiment of the EHE controller 115 receives the torque signal 102 and generates the control parameter, (P) 122, based on the torque signal 102. The EHE controller 215 includes a torque signal interpreter 232, a torque value calibrator 238 and a parameter determination module 234.

The torque signal interpreter 232 receives the torque signal 102 which, in some examples, is a digital signal representing a physical torque value with units of N□m (i.e., Newton⌊meters). The torque signal interpreter 132 transforms the digital torque signal 102 into its corresponding physical torque value 236 and provides the physical torque value 236 to the torque value calibrator 238.

The torque value calibrator 238 forms a calibrated torque value 240 by mapping the entire range of possible physical torque values 236 to an easy to use range of values. In general, a given physical torque values 236 represented by the torque signal 102 can be either positive or negative. For example, if the automobile engine is causing the automobile to accelerate (i.e., a positive engine load), the physical torque value 236 is positive. If the automobile engine is engaged to the automobile drive train and the automobile is decelerating (i.e., engine braking causing a negative engine load), the physical torque value 236 is negative. Furthermore, in some examples, the maximum positive physical torque value is different than the maximum negative physical torque value.

The mapping performed by the torque value calibrator 238 is illustrated by the following example. In this example, the range of possible physical torque values 236 for one exemplary vehicle may be −80 Nm to 400 Nm. The torque signal calibrator 238 scales the physical torque value 236 in such a way that physical torque values 236 in the range of 0 Nm to 400 Nm are mapped to a range of 0% to 100%. This is accomplished by multiplying the physical torque value 236 by a scale factor of 0.25. Similarly, physical torque values 236 in the range of −80 Nm to 0 Nm are multiplied by the 0.25 scale factor, thereby mapping these torque values to a range of −20% to 0%. Thus, for this example, the calibrated torque value 240 output from the torque value calibrator 238 falls within a range of −20% to 100%.

The calibrated torque value 240 is then provided to a control parameter determination module 234. In this embodiment, the control parameter determination module 234 simply uses the calibrated torque value as the control parameter, (P) 122. As is described above, the control parameter 122 is provided to the mapping elements (FIG. 1, element 126) included in the engine harmonic scaling elements (FIG. 1, element 120).

3 Mapping Element

Figure 3:
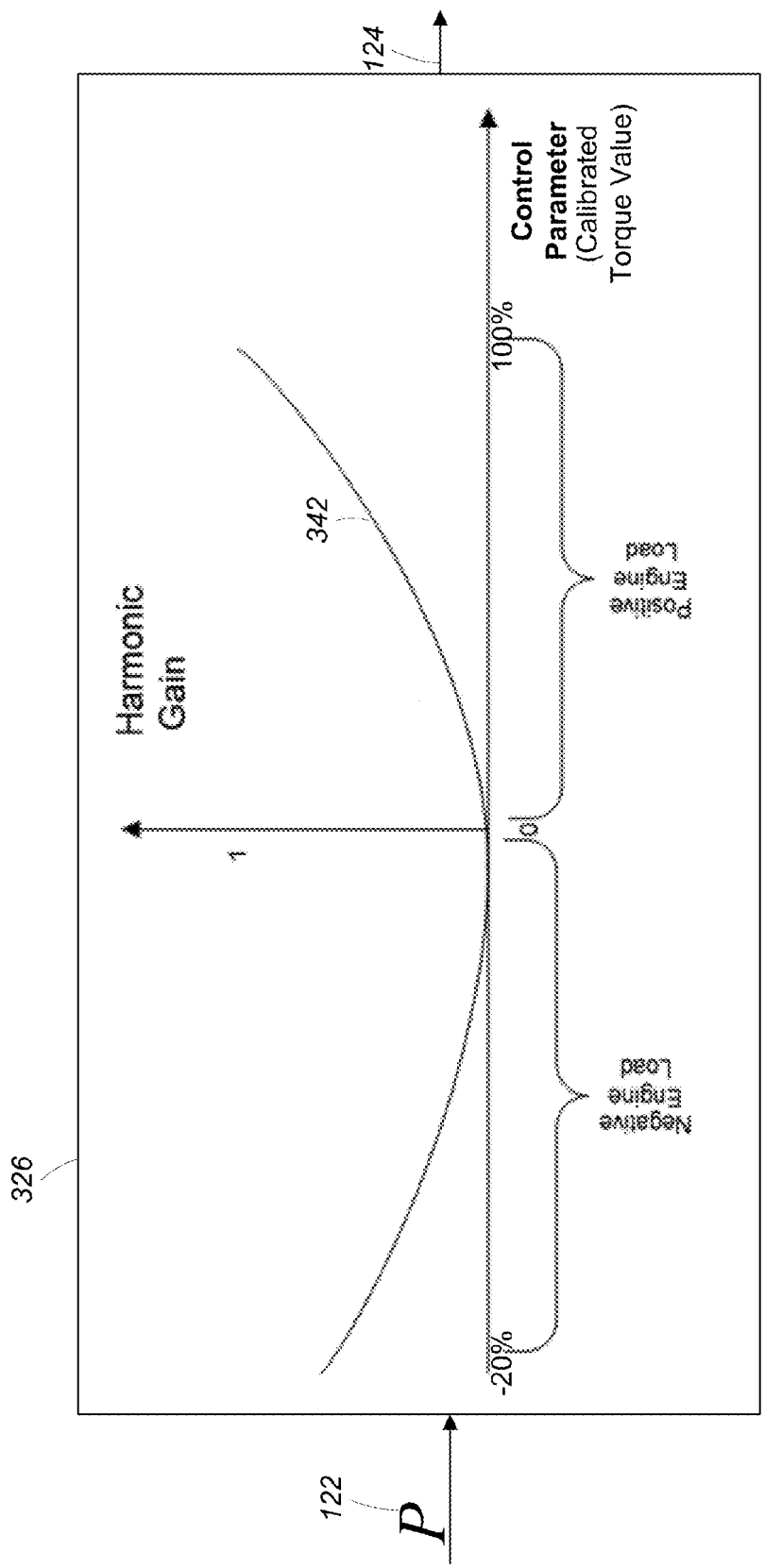
FIG. 3 is a first mapping element.

Referring to FIG. 3, one example of a mapping element 326 receives the control parameter 122 which was generated by the EHE controller 115 of FIG. 3 and uses the control parameter 122 to determine a harmonic scaling value 124. In particular, the value of the control parameter 122 is found on the x-axis (which ranges from −20% to 100% as in the example described above) and the value of the harmonic gain curve 342 at the control parameter 122 value is output as the harmonic scaling value 124.

Note that the harmonic scaling curve 342 is asymmetric about the harmonic gain axis (i.e., the y-axis). This asymmetry accounts for situations where an individual harmonic level in an engine noise generated by an engine experiencing a positive engine load (i.e., while accelerating) is different than an individual harmonic level in an engine noise generated by an engine experiencing a negative engine load (i.e., while engine braking).

Figure 4:
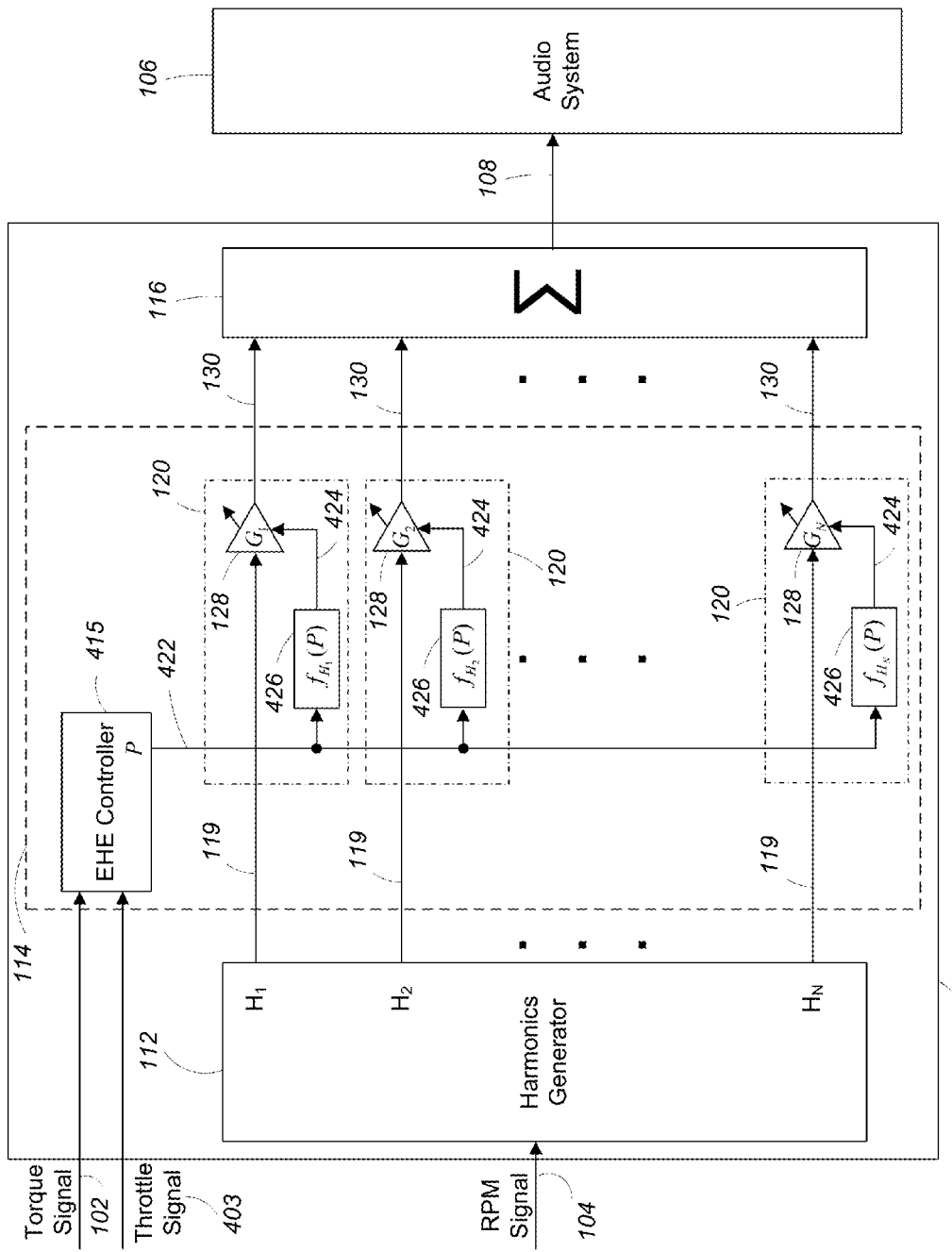
FIG. 4 is a block diagram of a second EHE system.

Referring to FIG. 4, another embodiment of an engine harmonic enhancement system 400 is configured in much the same way as the engine harmonic enhancement system 100 of FIG. 1 but is further configured to accept a throttle signal 403 which the EHE controller 415 uses in conjunction with the torque signal 102 to determine the control parameter, (P) 422. In some examples, the throttle signal 403 represents a percentage of throttle opening.

4 Torque and Throttle Based EHE Controller

Figure 5:
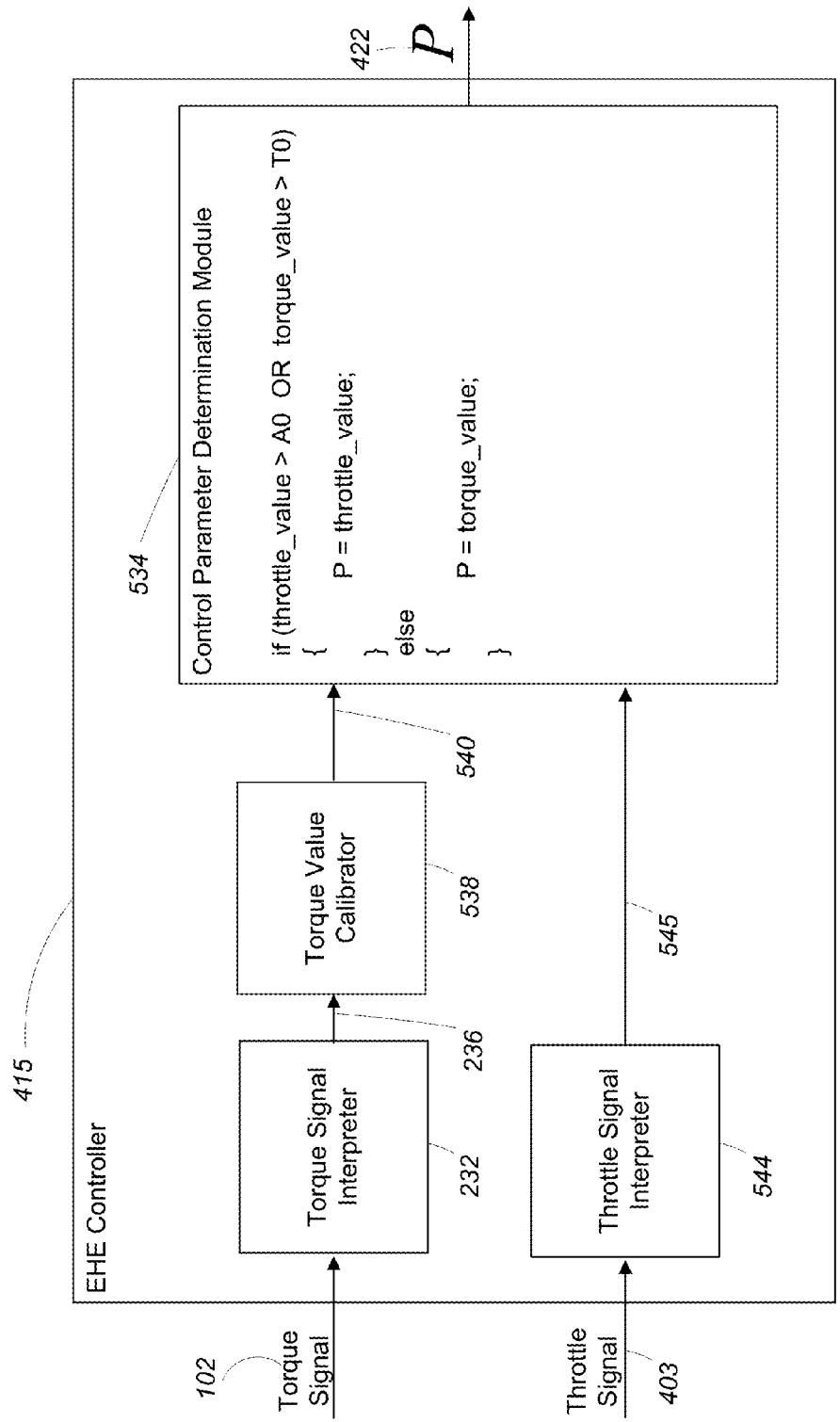
FIG. 5 is a block diagram of a second EHE controller.

Referring to FIG. 5, the EHE controller 415 of in FIG. 4 is configured to accept the torque signal 102 and the throttle signal 403 as signal inputs and to use the signal inputs 102, 403 to determine the control parameter, (P) 422. In general, for positive engine loads, the EHE controller 415 is configured to use a throttle percentage value 545 as the control parameter 422. For negative engine loads, the EHE controller 415 is configured to use a calibrated torque signal 540 as the control parameter 422.

The EHE controller 415 includes a torque signal interpreter 232, a torque value calibrator 538, a throttle signal interpreter 544, and a control parameter determination module 534.

The throttle signal interpreter 544 receives the throttle signal 403 which, in some examples, is a digital signal representing a percentage of throttle opening in the range of 0% to 100%. The throttle signal interpreter 132 transforms the digital throttle signal 403 into its corresponding throttle percentage value 545. In some examples, the throttle percentage value 545 is already in the form of a percentage with a range of 0% to 100% and therefore does not need to be calibrated. In other examples, a scaling factor of 1.0 can be applied to the throttle percentage value 545 to preserve its range of values.

The torque signal interpreter 232 interprets the torque signal 102 in the same as way as the torque signal interpreter 232 of FIG. 2, generating a physical torque value 236. The physical torque value 236 is passed to the torque value calibrator 538 which scales the physical torque value 236 such that negative physical torque values 236 are mapped to a range of −100% to 0% (or −1 to 0). For example, the range of physical torque values 236 for one exemplary vehicle may be −100 Nm to 400 Nm. The torque signal calibrator 538 scales the physical torque values 236 in such a way that physical torque values 236 in the range of −100 Nm to 0 Nm are mapped to a range of −100% to 0%. In this example, this can be accomplished by multiplying the physical torque value 236 by a scale factor of 1.25.

The throttle percentage value 544 and the calibrated torque value 540 are provided to the control parameter determination module 534 which uses the values 544, 540 to determine the control parameter, (P) 422. In particular, if the throttle percentage value 544 is greater than a predetermined throttle threshold, A0, OR if the calibrated torque value 540 is greater than a predetermined torque threshold, T0, the throttle percentage value output as the control parameter 422. Otherwise, the calibrated torque value 540 is output as the control parameter 422. In some examples, the threshold values T0 and A0 are equal to zero. In other examples, the threshold values T0 and A0 are values close to zero.

The resulting control parameter 422 output from the EHE controller 415 is bounded to a range of −100% to 100%. When the engine load is negative, the control parameter 422 includes a calibrated torque value 540 within the range of −100% to 0% and when the engine load is positive, the control parameter includes a throttle percentage value 544 within the range of 0% to 100%.

5 Combined Torque and Throttle Based Mapping Element

Figure 6:
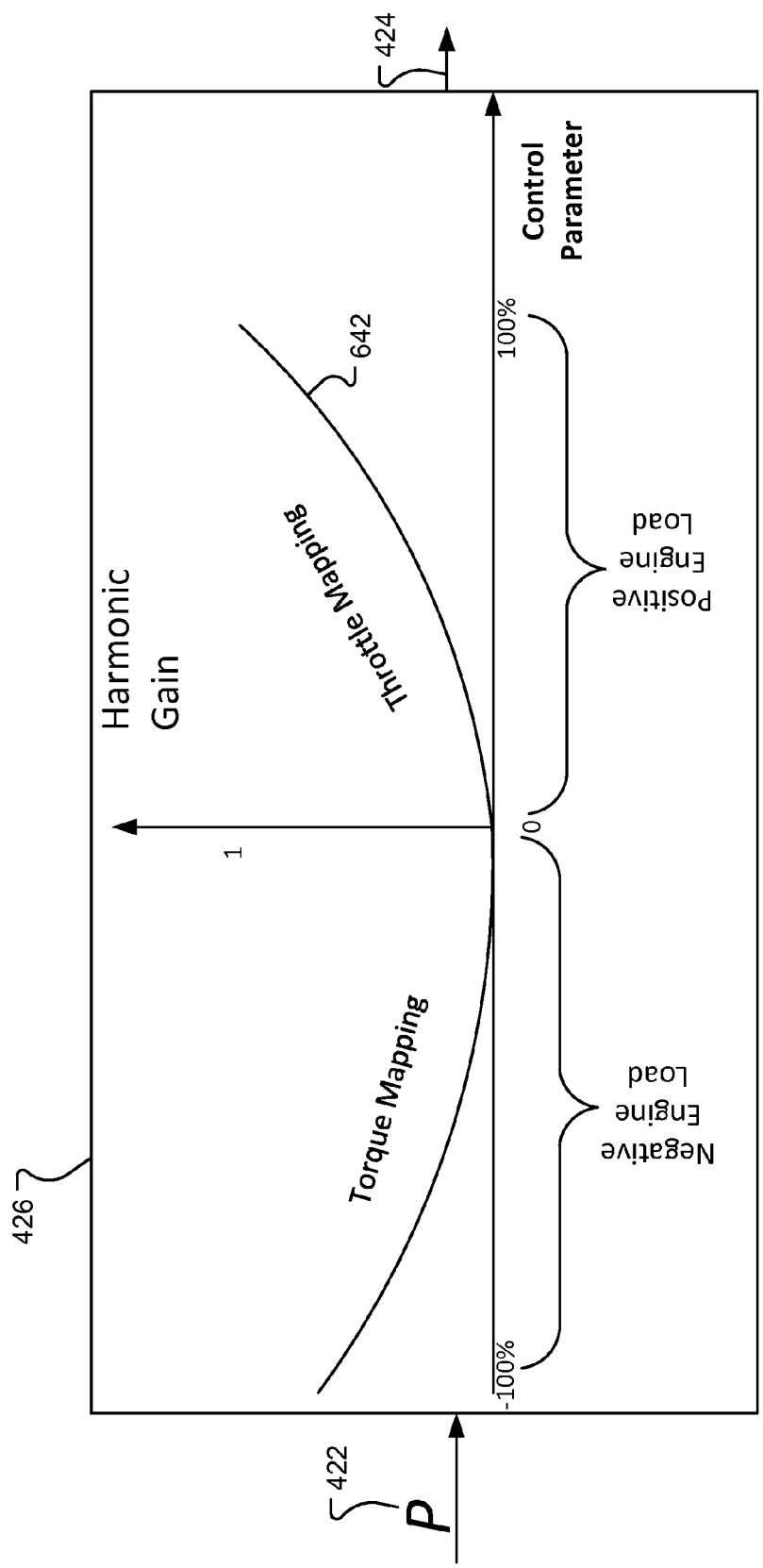
FIG. 6 is a second mapping element.

Referring to FIG. 6, another example of a mapping element 426 receives the control parameter 422 which was generated by the EHE controller 415 of FIG. 4 and uses the control parameter 422 to determine a harmonic scaling value 424. In particular, the value of the control parameter 422 is found on the x-axis (which ranges from −100% to 100% as in the example described above) and the value of the harmonic gain curve 642 at the control parameter 422 value is provided as the harmonic scaling value 424 output.

Again, note that the harmonic scaling curve 642 is asymmetric about the harmonic gain axis (i.e., the y-axis). This asymmetry accounts for situations where an individual harmonic level in an engine noise generated by an engine experiencing a positive engine load (i.e., while accelerating) is different than an individual harmonic level in an engine noise generated by an engine experiencing a negative engine load (i.e., while engine braking). Also note that the control parameter 422 values from −100% to 0% are based on negative torque values 536 and the control parameter values 422 from 0% to 100% are based on positive throttle percentage values 545.

6 Blipping Resistant EHE Controller

Figure 7:
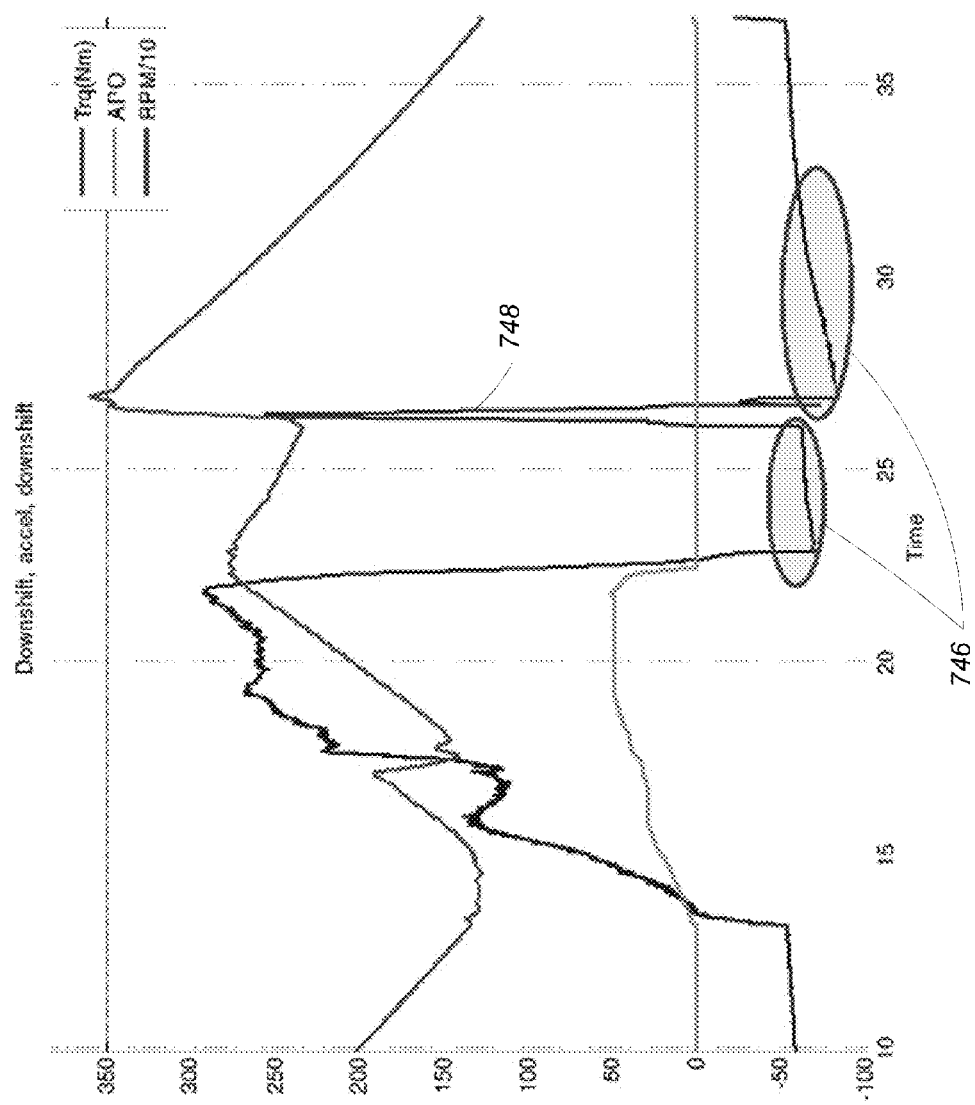
FIG. 7 is a graph illustrating blipping.

Referring to FIG. 7, in some examples, during engine braking an automobile may shift from a higher gear to a lower gear (i.e., downshift). In order to shift gears, a clutch which couples an engine of the automobile to a drive train of the automobile is disengaged at which time the RPMs of the automobile engine decrease to an idling level while the drive train of the automobile continues to rotate at a high rate. Re-engaging the clutch at the lower gear while the engine is rotating at the idling level can cause an abrupt and undesirable decrease in speed as the quickly rotating drive train couples to the more slowly rotating engine.

To avoid this abrupt decrease in speed, the engine RPMs can be increased such that the engine is rotating at a rate which is comparable that of the drive train, a technique referred to as 'RPM Matching.' This increase in engine RPMs prior to engaging the clutch is also sometimes referred to as 'blipping.'

The circled areas 746 in FIG. 7 illustrate the torque output of an automobile engine during engine braking. The spike in torque 748 between the two circles illustrates the torque of the engine as the automobile downshifts and blipping occurs. This type of spike 748 in the torque signal can have a detrimental effect on EHE systems which utilize torque information (e.g., the systems described above). In particular, such a spike can cause the EHE system to generate a loud and undesirable engine noise for a very short time. In some examples, the loud engine noise is an engine noise associated with engine acceleration and not with engine braking, as would be expected.

Figure 8:
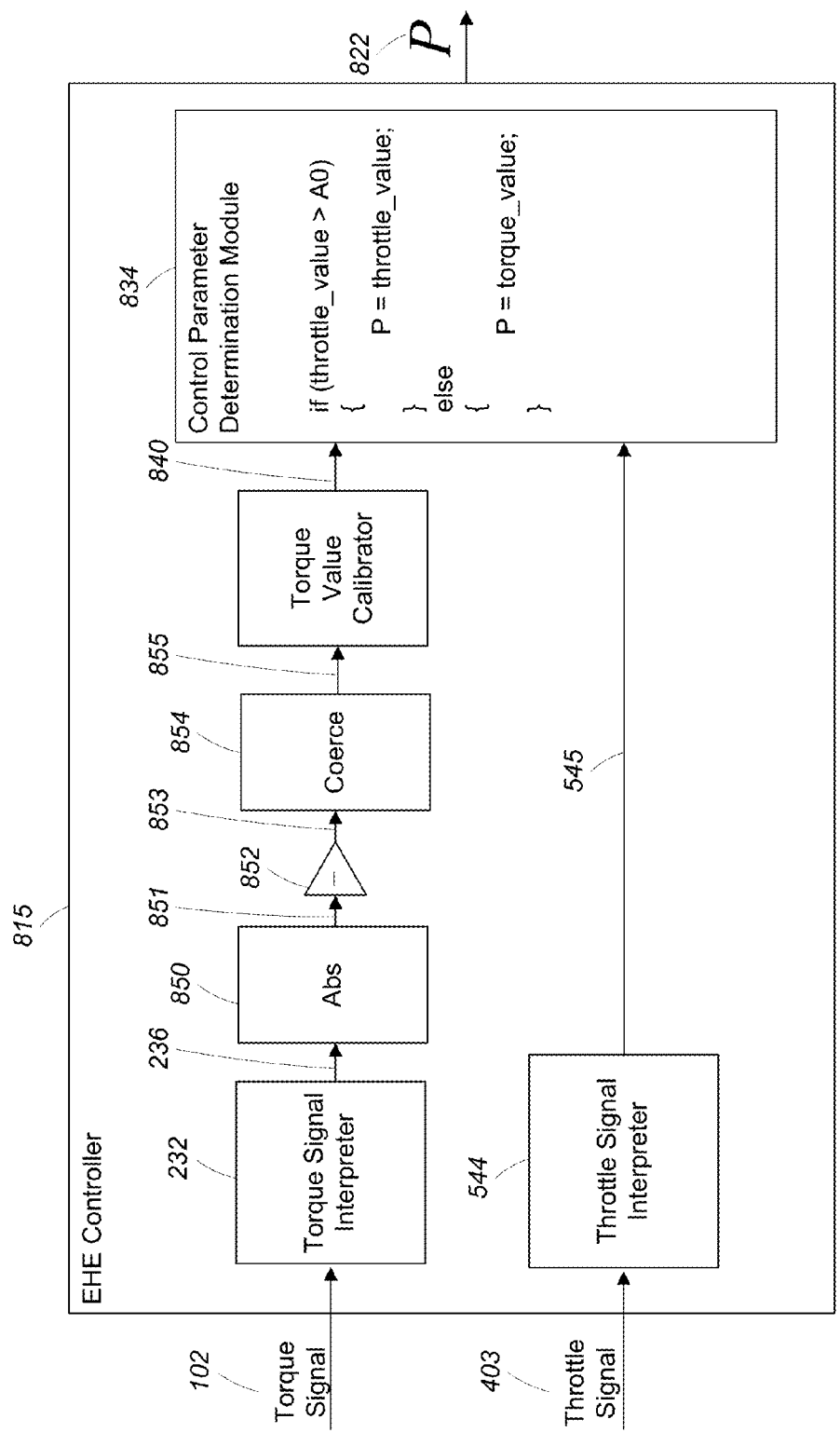
FIG. 8 is a block diagram of a third EHE controller.

Referring to FIG. 8, another embodiment of an EHE controller 815 is configured to generate the control parameter 822 in a way that lessens the effect of blipping on EHE systems which utilize torque information. The EHE controller 815 operates similarly to the EHE controller 415 illustrated in FIG. 5. However, before being provided to the torque value calibrator 538, the physical torque value 236 is first provided to an absolute value element 850 which generates the absolute value 851 of the physical torque value 236. The absolute value 851 of the physical torque value 236 is provided to a negation module 852 which generates a negated absolute value 853 of the physical torque value 236. The negated absolute value 853 of the physical torque value 236 is then provided to a coercion module 854 which coerces the negated absolute value 853 of the physical torque value 236 to a predetermined range. In some examples, the predetermined range is defined as the range which includes all possible torque values between a maximum torque output of the automobile engine and a minimum torque output of the automobile engine.

The coerced negated absolute value 855 is provided to the torque value calibrator 538 which scales the coerced negated absolute value 855 of the physical torque value 236 such that negative values of the coerced negated absolute value 855 of the physical torque signal 236 are mapped to a range of −100% to 0% (or 0 to 1). The output of the torque value calibrator 538 is a calibrated torque value 840 which is provided to the control parameter determination module 834 along with the throttle percentage value 544. If the throttle percentage value 544 is greater than a predetermined threshold, A0, the throttle percentage value 545 is output as the control parameter 822. Otherwise the calibrated torque value 840, which is conditioned such that effects of blipping are minimized, is output as the control parameter 822.

7 Alternatives

Figure 9:
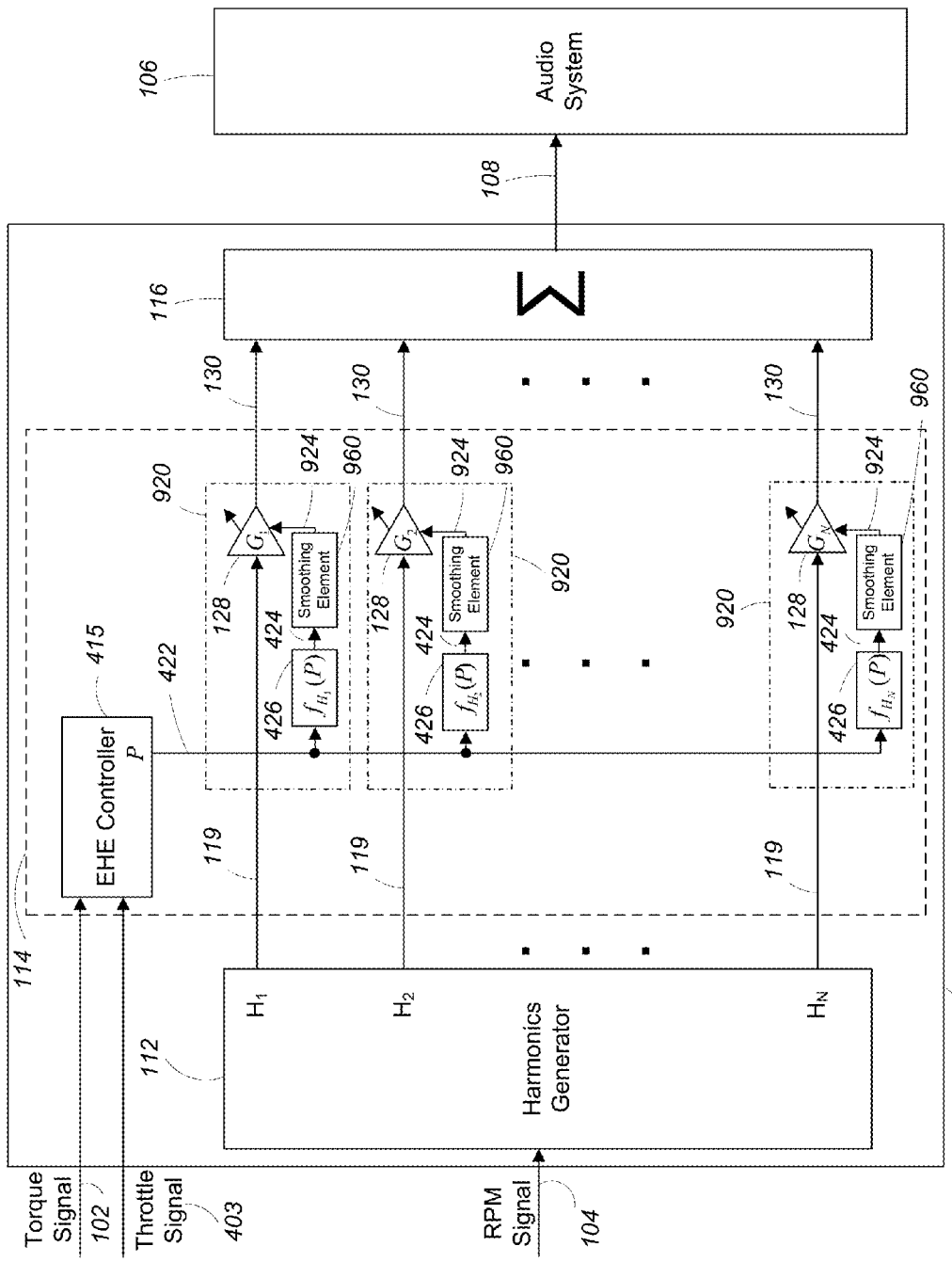
FIG. 9 is a block diagram of a third EHE system.

Referring to FIG. 9, in some examples, each of the engine harmonic scaling elements 920 of the engine harmonic enhancement system 900 includes a smoothing element 960 which receives the harmonic scaling value 424 generated by the mapping element 426 and uses it to generate at smoothed harmonic scaling value 924.

In some examples, the smoothing element 960 generates the smoothed harmonic scaling value 925 by applying an attack and decay algorithm. Such an algorithm causes abrupt changes in the harmonic scaling value to be represented more gradually in the harmonic scaling value 924.

In some examples, the torque signal 102 and the throttle signal 403 are received from a controller area network (CAN) bus.

8 Implementations

Systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

It is to be understood that the foregoing description is intended to illustrate and not to limit the scope of the invention, which is defined by the scope of the appended claims. Other embodiments are within the scope of the following claims.

What is claimed is:

1. An engine harmonic enhancement control system comprising:
    circuitry for providing:
        a controller configured to receive a first signal representative of a load on an engine and to generate a control parameter based on the first signal;
        one or more harmonic scaling elements, each configured to receive the control parameter and a different engine harmonic signal of a plurality of engine harmonic signals and to generate a scaled version of the received engine harmonic signal, each harmonic scaling element including
            a harmonic specific mapping element for mapping the control parameter to a harmonic specific scaling factor, wherein at least some of the harmonic specific scaling factor values of the harmonic specific mapping element are mapped to control parameter values which are associated with a negative load on the engine; and
            an adjustable gain element for forming a scaled version of the received engine harmonic signal including applying the harmonic specific scaling factor to the received engine harmonic signal,
    wherein the controller is further configured to receive a second signal representative of a throttle position and wherein the controller is further configured to generate the control parameter based on both the first signal and the second signal,
    wherein at least some of the harmonic specific scaling factors of the harmonic specific mapping element are mapped to control parameter values which are associated with a positive load on the engine, and
    wherein the control parameter values which are associated with the negative load on the engine are derived from the first signal and the control parameter values which are associated with the positive load on the engine are derived from the second signal.

2. The system of claim 1 wherein the controller is further configured condition the first signal to remove transient components before generating the control parameter.

3. The system of claim 1 wherein the first signal includes a torque signal.

4. A method comprising:
    receiving a plurality of engine harmonic signals;
    receiving a first signal representative of a load on an engine;
    determining a control parameter based on the first signal;
    determining a harmonic specific scaling factor for each of one or more engine harmonic signals of the plurality of engine harmonic signals including,
        for each of the one or more engine harmonic signals, providing the control parameter to a corresponding harmonic specific mapping function configured to map control parameter values to harmonic specific scaling factor values;
        wherein at least some of the harmonic specific scaling factor values are mapped to control parameter values which are associated with a negative load on the engine; and
    applying the corresponding harmonic specific scaling factor to each of the one or more engine harmonic signals,
    further comprising receiving a second signal representative of a throttle position and wherein determining the control parameter is based on both the first signal and the second signal,
    wherein at least some of the harmonic specific scaling factors are mapped to control parameter values which are associated with a positive load on the engine
    wherein the control parameter values which are associated with the negative load on the engine are derived from the first signal and the control parameter values which are associated with the positive load on the engine are derived from the second signal.

5. The method of claim 4 wherein determining the control parameter based on the first signal includes conditioning the first signal to remove transient components.

6. The method of claim 4 wherein the first signal includes a torque signal.

* * * * *